United States Patent [19]

Caillol

[11] Patent Number: 5,005,907
[45] Date of Patent: Apr. 9, 1991

[54] CONTINUOUS JOINT FOR A SEAT WITH AUTOMATIC CLEARANCE COMPENSATION

[75] Inventor: André Caillol, Paris, France

[73] Assignee: Tubauto, Levallois-Perret, France

[21] Appl. No.: 446,480

[22] Filed: Dec. 5, 1989

Related U.S. Application Data

[63] Continuation-in-part of Ser. No. 128,425, Dec. 3, 1987, Pat. No. 4,887,863.

[30] Foreign Application Priority Data

Dec. 3, 1986 [FR] France .................. 86 16917

[51] Int. Cl.$^5$ ............................. B60N 1/06
[52] U.S. Cl. .................... 297/362; 74/409; 475/162
[58] Field of Search ............ 297/362; 74/804, 805, 74/409, 440

[56] References Cited

U.S. PATENT DOCUMENTS

| | | | |
|---|---|---|---|
| 4,371,207 | 2/1983 | Wilking et al. .......... 297/362 X |
| 4,453,767 | 6/1984 | Walk et al. ............. 297/362 |
| 4,457,556 | 7/1984 | Klingelhofer .......... 297/362 |
| 4,582,360 | 4/1986 | Becker ................ 297/362 |
| 4,612,822 | 9/1986 | Nishikawa et al. ....... 74/805 X |

FOREIGN PATENT DOCUMENTS

| | | | |
|---|---|---|---|
| 99549 | 2/1984 | European Pat. Off. ..... 297/362 |
| 889094 | 7/1953 | Fed. Rep. of Germany .... 74/440 |
| 3129672 | 10/1982 | Fed. Rep. of Germany ... 297/362 |
| 2307495 | 11/1976 | France ................ 297/362 |
| 2107386 | 4/1983 | United Kingdom ........ 297/362 |

Primary Examiner—Peter R. Brown
Attorney, Agent, or Firm—Dennison, Meserole, Pollack & Scheiner

[57] ABSTRACT

Continuous joint permitting automatic compensation of clearances consisting of a fixed plate integral with the seat part and a moving plate integral with the back, this assembly capable of having an angular movement of one of the parts in relation to the other in which: an elastic bearing is inserted between the eccentric constituting a cam and a tooth part which it drives. One of the plates is provided with a shaft which is seated in a bearing aperture of the eccentric constituting a cam bearing aperture which is provided with two main support zones on which the shaft bears.

9 Claims, 4 Drawing Sheets

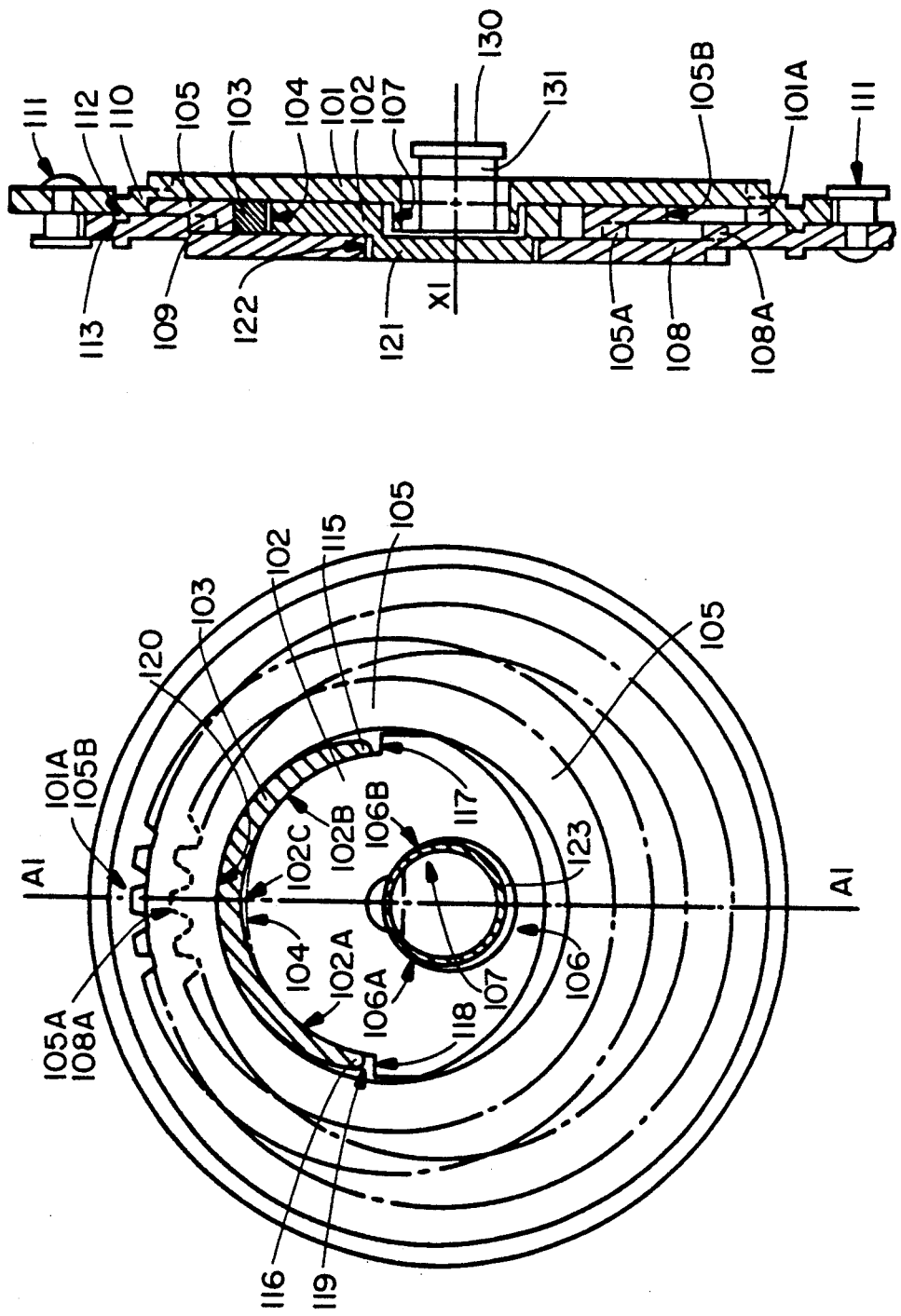

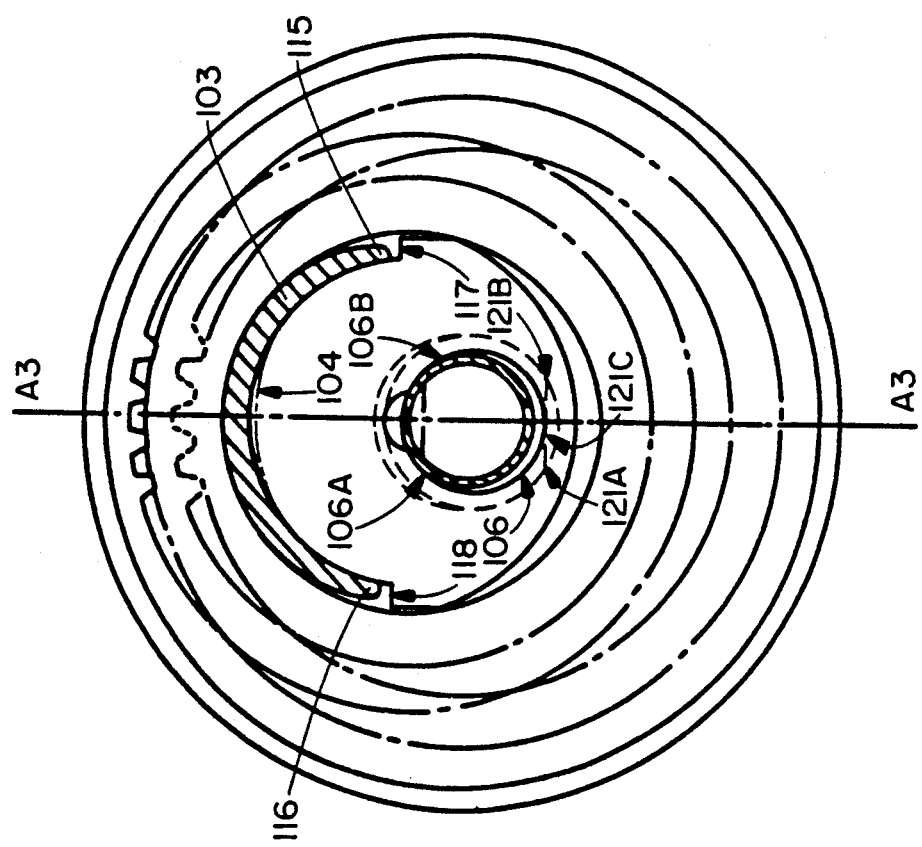

5,005,907

CONTINUOUS JOINT FOR A SEAT WITH AUTOMATIC CLEARANCE COMPENSATION

The present application is a continuation-in-part of U.S. application Ser. No. 128,425, filed Dec. 3, 1987 now U.S. Pat. No. 4,887,863, issued Dec. 19, 1987.

BACKGROUND OF THE INVENTION

It concerns a continuous joint for a seat with an adjustable back which is principally used to adjust the back of a vehicle seat but can also be used for other types of seats.

This continuous joint comprises a fixed plate, integral with the seat-part of the seat and a movable plate, integral with the back, said plates being laterally secured to each other in confronting relationship. One of said plates is provided with a shaft disposed about a central axis. An eccentric constituting a cam is provided with a bearing aperture in which is seated the shaft. This eccentric is rotatable about the central axis enabling the angular position of one of the two plates to be varied in relation to the other by partial engagement of at least two sets of teeth. A first set of teeth, integral with one of the two plates, is centered on said central axis about which the eccentric constituting a cam turns and a second corresponding set of teeth is integral with a part driven by the eccentric constituting a cam in such a way as to displace around said central axis the partial engagement zone. According to the invention the eccentric constituting a cam has on its periphery, in the most eccentric zone in relation to the axis, an elastic bearing made of a metal or a metal alloy integral with this eccentric constituting a cam. This elastic bearing is elastically held directly or indirectly against the face of the tooth part driven by this eccentric constituting a cam in such a way as to hold the second set of teeth integral with this part against the first set of teeth in the partial engagement zone.

The bearing aperture of the eccentric constituting a cam is provided with two main support zones in relief on which the shaft bears to provide a reactive force to the force applied by said elastic bearing against the driven face of said tooth part. Said support zones are angularly spaced 90°-150° apart and preferably about 120° apart, on opposed sides of a plane containing the central axis and a diametral line symmetrically bisecting the partial engagement zone of said at least two sets of teeth.

SUMMARY OF THE INVENTION

Preferably, the eccentric constituting a cam has on its periphery a recess which extends over an angular peripheral zone between 120°-200° about the axis of rotation and which traverses the zone of greatest eccentricity of said eccentric constituting a cam. Said recess comprises a central area and side areas terminated by stepped cam portions, said elastic bearing being seated in said recess and having end portions cooperating with said stepped cam portions to limit angular movements of said elastic bearing.

Advantageously, the elastic bearing is curved in such a way as to arch above the central area while contacting both side areas of said recess without contacting both stepped areas simultaneously.

Advantageously, also, the bearing aperture of the eccentric constituting a cam has an ovoid shape which is such that the shaft seated inside it bears on two main support zones in relief under a force applied by the elastic bearing against the driven face of the tooth part.

According to a particular embodiment of the continuous joint, the eccentric constituting a cam is not only provided with a bearing aperture having two main support zones on which is seated a first shaft which is provided in one of the two plates, but is also provided with a second shaft seated in a bearing aperture realized on the other plate and centered on the central axis, said second shaft being provided with two support zones angularly spaced 90°-150°, and preferably about 120° apart, on opposed sides of the plane containing the central axis and the diametral line symmetrically bisecting the partial engagement zone. Advantageously, the second shaft comprises a flat surface, the edges of which are connected to the cylindrical surface constituting the two main support zones in relief.

Advantageously, the continuous joint comprises at least one ball-bearing inserted between the elastic bearing and the driven face of the tooth part driven by the eccentric constituting a cam. Preferably, this ball-bearing comprises an internal cage against which the elastic bearing acts.

Frequently, the tooth part driven by the eccentric constituting a cam is a planet-wheel which has two sets of teeth, one of which partially engages with a set of teeth integral with the fixed plate and the other with a set of teeth integral with the movable plate.

According to another embodiment, the planet-wheel driven by the eccentric constituting a cam has a single set of teeth which partially engages with both sets of teeth integral with the fixed plate and the movable plate.

According to still another embodiment, the part driven by the eccentric constituting a cam forms an integral part of one of the two plates of the continuous joint. The set of teeth which is integral with said one plate engages partially with the set of teeth which is integral with the other plate.

The examples and the Figures below show non-limitatively several embodiments of the continuous joint according to the invention.

BRIEF DESCRIPTION OF THE DRAWINGS

FIG. 1 is a schematic front view showing the zone comprising the eccentric constituting a cam of a continuous joint according to the invention, said eccentric being provided with a bearing aperture having two main support zones and driving a planet-wheel;

FIG. 2 is a diagrammatic section of FIG. 1 seen from the left on diametral plane A1—A1 of FIG. 1;

FIG. 5 is a schematic front view of another embodiment of the continuous joint of FIG. 1;

FIG. 6 is a diagrammatic section seen from the left on diametral plane A3—A3 of FIG. 5.

DESCRIPTION OF THE PREFERRED EMBODIMENTS

Figure 4:
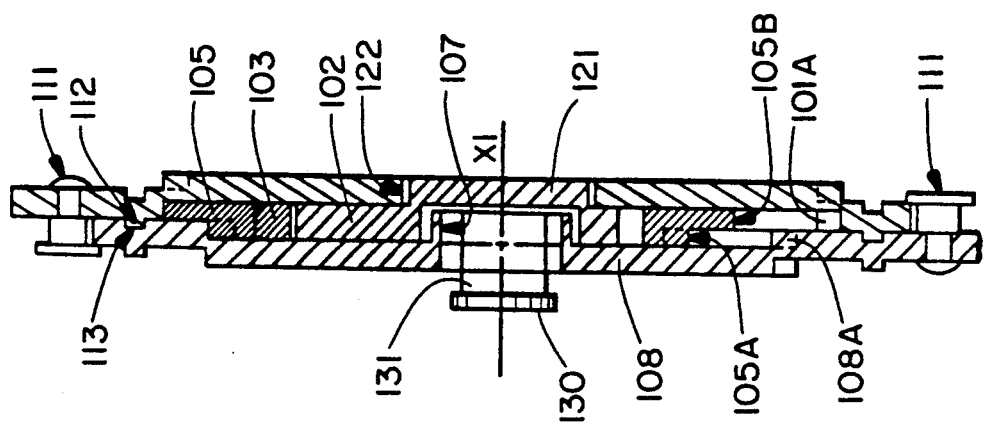
FIG. 4 is a diagrammatic section seen from the right on diametral plane A2—A2 of FIG. 3.

FIGS. 1 and 2 show, in diagrammatic form, an embodiment of a continuous joint for adjustable-back seat according to the invention.

FIG. 1 is a schematic front view of the zone of generally circular shape of this continuous joint, fixed plate 101 being cut out along the plane of its internal face in contact with the eccentric constituting a cam 102.

Thus, the structure of this eccentric is shown clearly with the elastic bearing 103 seated in the recess 104 of the eccentric and double planet-wheel 105.

This eccentric constituting a cam 102 is provided with a bearing aperture 106 in which is seated tubular shaft 107 which is integral with fixed plate 101 as shown more clearly by FIG. 2. The tubular shaft 107 is of circular cross-section around central axis X1. The bearing aperture 106 has an ovoid cross-section presenting two main support zones in relief 106A-106B. The tubular shaft 107 bears against these two main support zones which, in the case of FIG. 1, are located essentially at 120° to each other.

These support zones are on opposed sides of the plane containing the central axis and the diametral line A1—A1 bisecting the partial engagement zone of the sets of teeth 101A, 108A, 105A, 105B.

FIG. 2 is a cross-section, along line A1—A1 of FIG. 1, seen from the left, showing the essential components of the continuous joint according to the invention and the way in which they are connected to each other. The way in which the fixed plate 101 and the movable plate 108 are connected respectively with the seat-part and the back of the vehicle seat are not shown since they are well known to the engineer.

FIG. 1 also shows in a fairly diagrammatic way the internal set of teeth 108A of the movable plate 108 in its zone of partial engagement 109 with the set of teeth 105A of the planet-wheel 105 together with the internal set of teeth 101A of the fixed plate 101 in its zone or partial engagement 110 with the set of teeth 105B of the planet-wheel 105.

As is normal with this type of continuous joint, guides or similar structures 111, ensure the holding of the fixed plate against the movable plate. The centering of the rotational movement of one of the plates in relation to the other around the central axis X1 is ensured by a circular crown 112 of the fixed plate 101 penetrating a circular recess 113 of the movable plate 108.

The eccentric constituting a cam 102 has in its upper zone a recess 104, of approximately semi-circular shape, occupied by the elastic bearing 103, the tapered ends 115, 116 of which have their movements limited by stepped parts 117, 118 of the eccentric 102. A slight lateral play 119 between the tapered ends 115, 116 of the elastic bearing 103 and the stepped parts 117, 118 of the eccentric is maintained. This lateral play is such that both tapered ends cannot come simultaneously in contact with the corresponding stepped parts. The elastic bearing 103 presents a curvature more pronounced than the curvature of the recess. It bears on zones 102A, 102B of the eccentric in the vicinity of its tapered ends and moves away from the upper zone 102C of the eccentric in its mid-section to apply a pressure distributed in the present mode of realization of the invention on the wall 120 of the hole constituting the pivot-bearing for planet-wheel 105 which surrounds the eccentric 102.

The bottom of the bearing aperture 106 of the eccentric 102 is closed off by an offset circular bulge 121 centered on the central axis X1 which fits with a slight clearance within a circular aperture 122 formed within the movable plate 108. A knob 130 connected to the circular bulge 121 by means of shaft 131 centered on the central axis permits rotation of eccentric 102.

The continuous joint thus described operates as follows: by driving in rotation by means of knob 130, the eccentric 102 constituting a cam, the latter drives planet-wheel 105.

The sets of teeth 105A, 105B of said planet-wheel engage partially with the sets of teeth 108A, 101A of plates 108, 101. Due to the different ratio of tooth numbers between the sets of teeth in mesh, an angular displacement results between the movable plate and the fixed plate. The two main support zones in relief 106A, 106B being located on opposed sides of the plane containing the central axis X1 and the diametral line A1—A1 bisecting the partial engagement zone, the pressure exerted by the elastic bearing 103 directly or indirectly, on the wall 120 of the hole in the part 105 driven by the eccentric 102 is thus perfectly shouldered by these main support zones. This permits a very easy compensation of the clearances between the sets of teeth engaging partially as well as play between other components and thus for the wear on shafts and the holes in which they are seated. As shown in FIGS. 1 and 2, a slight clearance 123 exists between the shaft and the bearing aperture in the region diametrally opposed to the two main support zones. Jerking and fluttering of the seat are thus prevented during adjustment of the angle of the seat-back and also, in the case of a vehicle seat, when sudden jerks result from sudden acceleration or deceleration of the vehicle. This makes for excellent comfort and security for the user of the seat.

Figure 3:
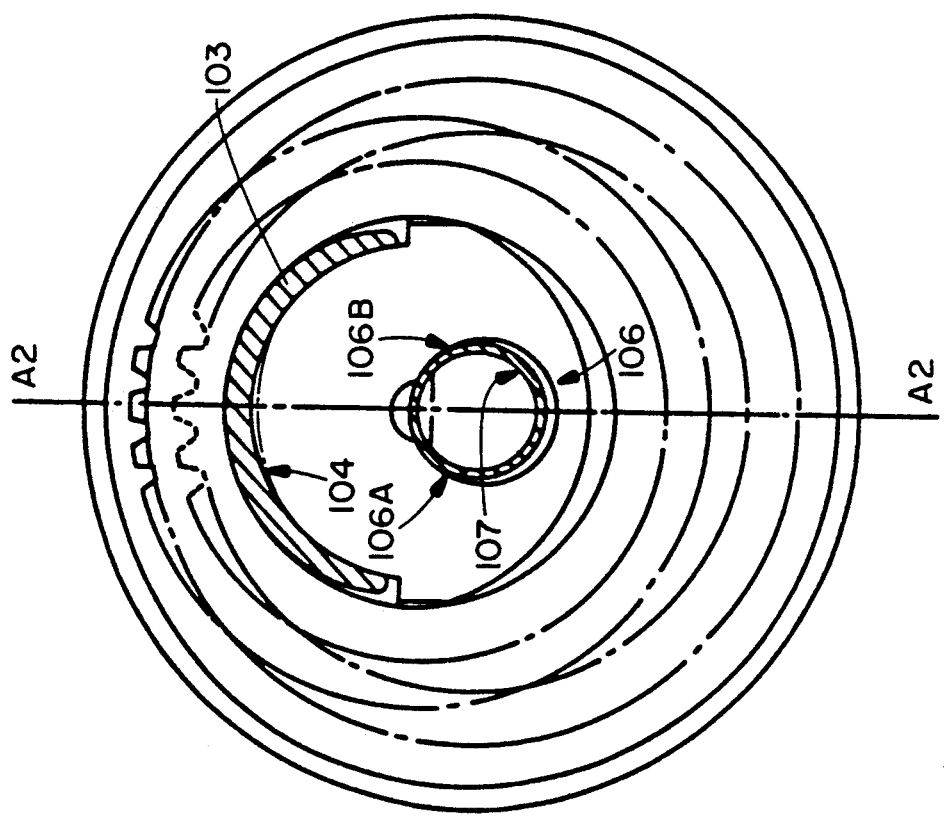
FIG. 3 is a schematic front view of another embodiment of the continuous joint of FIG. 1 in which the eccentric constituting a cam is centered on the movable plate instead of the fixed plate.

FIGS. 3 and 4 present a second embodiment of the continuous joint shown on FIG. 1 and 2. In this embodiment, the tubular shaft 107 which is seated in the ovoid bearing aperture 106 of the eccentric constituting a cam 102 is integral with the movable plate 108. In FIG. 3, which is a schematic front view of the zone of generally circular shape of this continuous joint, the movable plate 108 is cut out along the plane of its internal face in contact with this eccentric 102. The tubular shaft 107 bears against the two main support zones 106A, 106B located at 12° to each other, as in the case of FIG. 1, and a slight clearance exists in the diametrally opposed region. The structure of the planet-wheel 105 and the arrangement of its sets of teeth 105A, 105B in partial engagement with the sets of teeth 108A, 101A of the movable and fixed plates, are the same. The elastic bearing 103, has the same structure, as in the case of FIG. 1, and is engaged in the same way in recess 104. As shown by FIG. 4, which is a cross-section, along line A2—A2 of FIG. 3, seen from the right, the circular bulge 121 forming the bottom of the bearing aperture 106 of the eccentric 102 is engaged with a slight clearance within a circular aperture 122 realized within the fixed plate 101. The knob 130 operates the continuous joint by means of a shaft 131 connected to the bulge in the same way as in the preceding embodiment.

FIGS. 5 and 6 present a third embodiment of the continuous joint according to the invention. This continuous joint presents a general structure similar to the general structure of the first embodiment shown on FIGS. 1 and 2. The eccentric constituting a cam 102 having in its upper zone an elastic bearing 103 which drives a plane-wheel 105 the sets of teeth of which 105A, 105B are in partial engagement with the corresponding sets of teeth 101A, 108A of one fixed plate 101 and one moving plate 108. The eccentric is provided with a bearing aperture 106 presenting an ovoid cross-section with two main support zone 106A, 106B, located approximately 120° to each other on which is seated a first shaft 107, tubular, of circular cross-section which is integral with the fixed plate 101. This eccentric presents also a bulge 121, forming the bottom of the bearing aperture 106, which is engaged within a circular aperture 108C realized within the movable plate.

Instead of having a slight clearance between said bulge 121 and said circular aperture 108C, said bulge 121 forms a second shaft presenting two main support 121A, 121B, zones angularly spaced approximately 90°–150° apart and preferably about 120°. These two support zones are on opposed sides of the plane containing the central axis and the diametral line A3—A3 bisecting the partial engagement zone. They come in contact with the wall of the circular aperture 108C which forms a bearing aperture for this second shaft 121. As shown by FIG. 5 in broken lines, the second shaft comprises a flat part 121C, the edges of which in connection with the cylindrical surface forming the two main support zones 121A, 121B about 120° apart, these main support zones being in contact with the wall of the circular aperture 108C forming the bearing aperture. In this way, the stability of the continuous joint is still improved. The cam-shaped eccentric is operated by means of the knob 130 connected to the bulge 121 as in the preceding embodiments.

Figure 7:
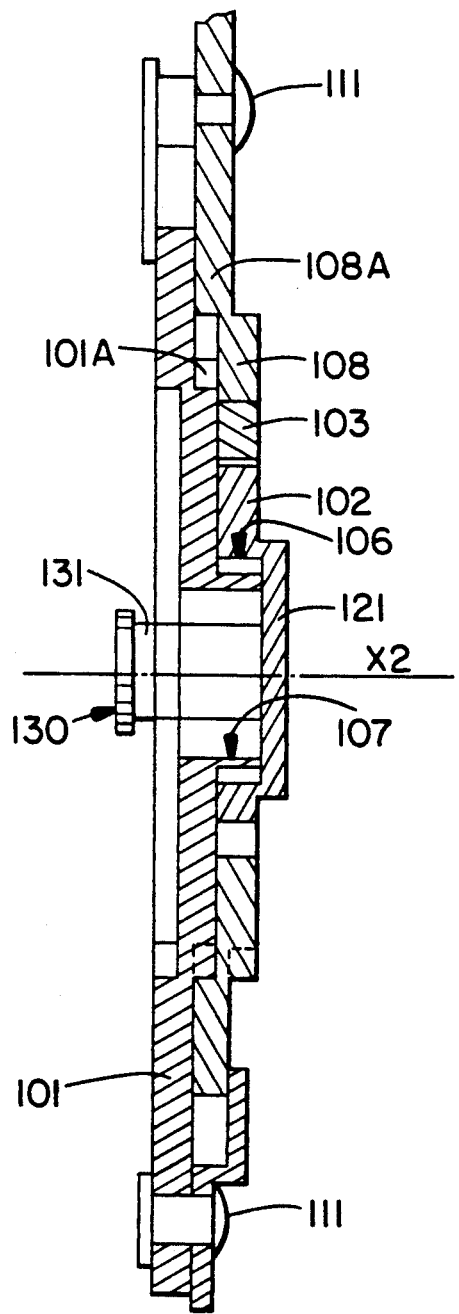
FIG. 7 is a diagrammatic section showing the eccentric constituting a cam of a continuous joint according to the invention provided with a bearing aperture having two main support zones and driving directly one of the two plates of this continuous joint.

FIG. 7 presents a diagrammatic section of a fourth embodiment of the continuous joint according to the invention. In this embodiment, the eccentric constituting a cam 102 having in its upper zone an elastic bearing 103 drives the movable plate 108, the set of teeth of which 108A being in partial engagement with the set of teeth 101A of the fixed plate 101. The eccentric 102 is provided, as in the case of the preceding embodiments, with a bearing aperture 106 presenting an ovoid cross-section with two main support zones located approximately 120° apart on opposed sides of the plane containing the central axis and the diametral line bisecting the partial engagement zone. Within said aperture is seated on said two main support zones a tubular shaft 107 of circular cross-section which is integral with the fixed plate 101 and centered on the axis X2 of said fixed plate. As in the case of preceding embodiments, said main support zones balance the pressure exerted by the elastic bearing 103 and ensure automatic compensation of clearance. The eccentric presents a a bulge 121 forming the bottom of the bearing aperture to which is connected the knob 130 to rotate this eccentric. Guide means 111 maintain both plates against each other while permitting the epicycloidal movement of the movable plate 108 by reference to the fixed plate 101.

As in the case of initial application U.S. Ser. No. 128,425 of Dec. 3, 1987, a ball bearing can be inserted between the elastic bearing and the face of revolution of the part driven by the eccentric constituting a cam of the continuous joint according to the invention. Preferably, this ball-bearing comprises an internal cage against which is acting the elastic bearing. In practice, that internal cage is fixed in relation to the elastic bearing under consideration.

According to the invention, the continuous joint can also comprise a planet-wheel, driven by an eccentric having an elastic bearing and a bearing aperture with two main support zones, which has only one set of teeth which partially engages with both sets of teeth of the movable and fixed plate.

A large number of modifications or adaptations of the continuous joint of the invention can be realized which do not go outside the field of the invention.

What is claimed is:

1. A continuous joint for a seat with an adjustable back comprising a fixed plate, integral with the seat-part of the seat and a movable plate, integral with the back, said plates being laterally secured to each other in confronting relationship, one of said plates being provided with a shaft disposed about a central axis, an eccentric constituting a cam provided with a bearing aperture in which is seated the shaft and rotatable about said central axis, enabling the angular position of one of the two plates to be varied in relation to the other by partial engagement of at least two sets of teeth, a first set of teeth, integral with one of the two plates being centered on said central axis, about which the eccentric constituting a cam turns and a second corresponding set of teeth being integral with a part driven by the eccentric constituting a cam, in such a way as to displace around said central axis the partial engagement zone, wherein, the eccentric constituting a cam has on its periphery, in the most eccentric zone in relation to the axis, an elastic bearing made of a metal or metal alloy, integral with this eccentric constituting a cam, which is elastically held, directly or indirectly against the driven face of the tooth part displaced by this eccentric constituting a cam, in such a way as to hold the second set of teeth, integral with this part, against the first set of teeth in the partial engagement zone, the bearing aperture of the eccentric constituting a cam being provided with two main support zones in relief, on which the shaft bears to provide a reactive force to the force applied by said elastic bearing against the driven face of said tooth part, said support zones being angularly spaced 90°–150° apart on opposed sides of a plane containing the central axis and a diametral line symmetrically bisecting the partial engagement zone of said at least two sets of teeth.

2. A continuous joint according to claim 1 wherein the eccentric constituting a cam has on its periphery a recess which extends over an angular peripheral zone between 120°–200° about the axis of rotation and which traverses the zone of greatest eccentricity of said eccentric constituting a cam, said recess comprising a central area and side areas terminated by stepped cam portions, said elastic bearing being seated in said recess and having end portions cooperating with said stepped cam portions to limit angular movements of said elastic bearing.

3. A continuous joint according to claim 2 wherein the elastic bearing is curved in such a way as to arch above the central area while contacting both side areas of said recess without contacting both stepped areas simultaneously.

4. A continuous joint according to claim 1 wherein the bearing aperture of said eccentric constituting a cam has an ovoid shape which is such that the shaft seated inside it bears on said two main support zones in relief, under a force applied by said elastic bearing against the driven face of said tooth part.

5. A continuous joint according to claim 1 wherein said eccentric constituting a cam is not only provided with a bearing aperture, having two main support zones on which is seated a first shaft provided on one side of said plates, but is also provided with a second shaft seated in the bearing aperture of the other said plate along said central axis, said second shaft being provided with two support zones angularly spaced 90°–150° apart on opposed sides of said plane containing the central axis and the diametral line symmetrically bisecting the partial engagement zone.

6. A continuous joint according to claim 1 wherein a ball bearing is inserted between the elastic bearing and the driven face of said tooth part displaced by the eccentric constituting a cam.

7. A continuous joint according to claim 1 wherein the part driven by the eccentric constituting a cam is a planet-wheel which has two sets of teeth, one of which partially engages with a set of teeth integral with the fixed plate and the other with a set of teeth integral with the movable plate.

8. A continuous joint according to claim 1 wherein the part driven by the eccentric constituting a cam is a planet-wheel with a single set of teeth which partially engages with both a set of teeth integral with the fixed plate and a set of teeth integral with the movable plate.

9. A continuous joint according to claim 1 wherein the part driven by the eccentric constituting a cam is one of the two plates of said continuous joint and wherein the set of teeth of said one plate driven by the eccentric engages partially with the set of teeth of the other plate.

* * * * *